United States Patent [19]

Yu

[11] Patent Number: 4,511,742

[45] Date of Patent: Apr. 16, 1985

[54] EXTRACTION OF OLIGOMERS FROM POLYMERS OF EPIHALOHYDRIN

[75] Inventor: Simon H. Yu, Parma, Ohio

[73] Assignee: The B. F. Goodrich Company, Akron, Ohio

[21] Appl. No.: 412,474

[22] Filed: Aug. 30, 1982

[51] Int. Cl.$^3$ ............... C07C 43/11; C07C 43/18; C07C 43/20

[52] U.S. Cl. .................... 568/614; 568/621

[58] Field of Search ............. 568/621, 614; 528/421

[56] References Cited

U.S. PATENT DOCUMENTS

| | | | |
|---|---|---|---|
| 3,361,831 | 1/1968 | Brunelle et al. | 568/614 |
| 3,393,157 | 7/1968 | Janssen et al. | 568/614 |
| 3,478,109 | 11/1969 | McConnell | 568/621 |
| 3,642,665 | 2/1972 | Gehin et al. | 528/421 |
| 4,192,943 | 3/1980 | Robinson | 568/621 |
| 4,256,904 | 3/1981 | Riew | 528/421 |
| 4,256,910 | 3/1981 | Hsu | 528/421 |
| 4,391,970 | 7/1983 | Okamoto | 568/614 |

FOREIGN PATENT DOCUMENTS 49-27564  7/1974  Japan ................... 568/621

Primary Examiner—Ethel G. Love
Attorney, Agent, or Firm—George A. Kap; Alan A. Csontos

[57] ABSTRACT

Cyclic oligomers are extracted from liquid polyethers, especially polymers of epihalohydrin, by contacting the polyethers with a hydrocarbon solvent containing 3 to 8 carbon atoms while agitating the polyethers.

10 Claims, No Drawings

EXTRACTION OF OLIGOMERS FROM POLYMERS OF EPIHALOHYDRIN

BACKGROUND OF THE INVENTION

Functionally terminated liquid polymers, also referred to herein as telechelic liquid polyethers, are well known commercially. In particular, telechelic epihalohydrin liquid polymers are currently being used as a toughening additive for reinforced unsaturated polyesters and thermoset polyesters, as a component of polyurethanes, as a component of non-solvent adhesives, as an impermeable and weatherable coating, and as an energetic binder as in rocket fuels.

Formation of cyclic oligomers, however, is a characteristic feature of the cationic ring-opening polymerization of cyclic ethers. In some cases, cyclic oligomers are the predominant products of the polymerization. Telechelic epihalohydrin liquid polymers are no exception and contain varying amounts of oligomers. The amount of cyclic oligomers is dependent on the nature of the cationic catalyst, polymerization conditions, and the molecular weight of the liquid polymer. For instance, the epihalohydrin liquid polymers can contain up to about 40% by weight of cyclic oligomers although liquid polymers of epihalohydrin generally contain about 5-20% by weight of oligomers. The presence of cyclic oligomers is undesirable in some applications. Since cyclic oligomers contain no functionality and their molecular weights are low, they may be useless for the intended purposes and may degrade the properties of the final products. The removal of nearly all or a portion of cyclic oligomers from polyethers can be accomplished pursuant to the invention described herein.

SUMMARY OF THE INVENTION

Removal of cyclic oligomers from telechelic liquid polyethers in general and from liquid polymers of epihalohydrin in particular, is accomplished by mixing the polymers with a solvent that is effective in extracting at least 75% of the oligomers present in the polymers, preferably at least 90%, in which solvent, the polymer itself is substantially insoluble.

DETAILED DESCRIPTION OF THE INVENTION

As used herein, the term "telechelic" is applied to the polymers with functionality on the end groups. Examples of such functional end groups are hydroxyl, carboxyl, amine, epoxy, vinyl, acrylic, carbonyl, nitrile, isocyanide and thiol.

As used herein, the term "polymer" includes homopolymers and copolymers. The term "copolymer" is applied to the polymers containing at least two different repeating units. Based on the arrangement of monomer units, copolymers can be random, graft, block and alternating. The term "polyethers" covers a number of polymers in which the repeating unit is connected by a carbon-oxygen bond. Examples of such homopolyethers are polyethylene oxide, polypropylene oxide, polyoxetane, polytetrahydrofuran, poly(1,3-dioxolan), polyformaldehyde, poly(allyl glycidyl ether), poly(n-butyl glycidyl ether), poly(trifluoroethyl glycidyl ether), and poly(trichlorobutylene oxide).

As used herein, the term "epihalohydrin polymers" includes epihalohydrin homopolymers and copolymers. The epihalohydrin monomers useful in preparing the polymers include epichlorohydrin, epibromohydrin, epiiodehydrin, and epifluorohydrin. Suitable comonomers contain 2 to 10 carbon atoms, preferably 2 to 6, and are selected from cyclic ethers such as phenyl glycidyl ether, allyl glycidyl ether, glycidyl methacrylate, 1,2-epoxy-3,3,3-trichlopopropane, trichlorobutylene oxide, trifluoroethyl glycidyl ether, oxetane, ethylene oxide, propylene oxide, tetrahydrofuran, 1,3-dioxolan, and the like. Block copolymers of epihalohydrin can also be synthesized from other telechelic polymers, preferably hydroxyl terminated, such as hydroxyl terminated polytetrahydrofuran, polybutadiene, poly(butadiene-styrene), polyethylene oxide, polypropylene oxide, poly(ethylene oxide-propylene oxide), poly(butadiene-acrylonitrile), and the like. In the copolymers, amount of an epihalohydrin can vary from about 1 to 99 parts by weight. In a preferred embodiment, amount of epihalohydrin is in the range of 5 to 90 parts by weight, remainder being the comonomers.

As used herein, the term "liquid polymers" is applied to the polymers having Brookfield viscosity of less than 16,000 Pa.S. at the operating temperature. In reference specifically to polymers of epihalohydrin, this invention is directed to the treatment of such polymers having molecular weight (Mn) in the range of about 500 to 50,000 but preferably 1000 to 10,000.

The Dreyfuss U.S. Pat. Nos. 3,850,856 and 3,850,857 describe preparation of epihalohydrin polymers by the cationic ring-opening polymerization. The '857 Dreyfuss patent discloses a process for polymerizing epihalohydrin using as a catalyst a trialkyl oxonium salt of an $HMF_6$ acid where M is a Group V element selected from phosphorus, arsenic, and antimony. The '856 Dreyfuss patent discloses an improvement over the '857 patent wherein polymerization of epihalohydrin is carried out in the presence of the same catalyst and also in the presence of water or ethylene glycol. The resulting polymers of epihalohydrin have terminal hydroxyl groups and are generally of lower molecular weight than the prior art polymers.

Depending on the molecular weight of the epihalohydrin polymers, the nature of the cationic catalyst, and polymerization conditions, the polymers can contain varying amounts of cyclic oligomers which are undesirable for a number of reasons. Amount of cyclic oligomers can vary up to about 40% by weight of the polymer but normally amount thereof is about 5 to 20% by weight, especially about 15% by weight. For instance, liquid polyepichlorohydrin having number average molecular weight of about 3,000 and Brookfield viscosity of about 110,000 cps at 25° C., contains about 15% oligomers by weight. After epihalohydrin is polymerized or copolymerized and the catalyst is deactivated, the polymers are treated with an appropriate solvent to remove oligomers therefrom either after or before the stripping of unreacted monomer(s).

Polymers of epihalohydrins are polyethers. It appears that most polyethers prepared by ring-opening polymerization in the presence of a cationic catalyst contain cyclic oligomers and, therefore, can be treated pursuant to the invention described herein for removal of the cyclic oligomers.

The cyclic oligomers referred to herein generally include the dimers, trimers, tetramers, pentanemers, hexamers, heptamers and the like of epihalohydrin, or whatever other monomer that is used to make the polymers or whatever the combination of epihalohydrin and other monomer. The major component of the cyclic oligomers is the pentanemer in the case of liquid polyepichlorohydrins.

The oligomers referred to herein are cyclic oligomers. Whereas polymers of epihalohydrin, for instance, have hydroxyl groups at terminal positions, the oligomers noted herein do not since they are cyclic. Absence of the terminal hydroxyl groups results in a substance that acts differently from the hydroxyl terminated polyepihalohydrins. Whereas gel permeation chromatography and liquid chromatography can be used to determine amount of the oligomers, field desorption mass spectrum technique can be used to determine the mass of the cyclic oligomers. Cyclic dimers of epichlorohydrin have molecular weight of 185, cyclic trimers have molecular weight of 277, cyclic tetramers have molecular weight of 370, and cyclic pentamers have molecular weight of 462.

The method related to the invention for removal of cyclic oligomers from liquid polyethers, generally, and liquid polymers of epihalohydrin especially, is generally known as liquid extraction. The liquid extraction may be carried out in a number of ways. In most instances, the liquid polymer to be treated is contacted, preferably intimately with a suitable immiscible or only partially miscible solvent which preferentially extracts cyclic oligomers. The contact of the liquid polymer and the solvent is for the purpose of mass transfer of cyclic oligomers from the polymer phase to the solvent phase. The extraction is then followed by physical separation of the two phases. Normally, the solvent-lean, residual feed polymer, with cyclic oligomers removed, partially or completely, by extraction is defined as the raffinate; the solvent-rich phase containing the extracted cyclic oligomers is defined as the extract. It is usually desired to separate the solvent and cyclic oligomers in the extract and to recover the solvent for reuse. Solvent recovery is usually accomplished by distillation. In addition to the nature of the solvent selected, the effectiveness of the extraction is influenced, for example, by change in the temperature. Since the viscosity of most liquid polymers is sensitive to the temperature and decreases at higher temperatures, higher temperatures normally help the contact between the polymer and the solvent more intimately, consequently, facilitate the mass transfer of cyclic oligomers from the polymer phase to the solvent phase as long as the solubility of the polymer in the solvent does not increase substantially and the two phases are not miscible.

Based on the extraction method described above, suitable solvents that can be used to extract cyclic oligomers from liquid polyethers generally, and liquid polymers of epihalohydrin especially, should meet a number of important criteria. The solvents should be inert to the liquid polymer and the cyclic oligomers; they should not be miscible or be only partly miscible with the liquid polymer; they should preferentially dissolve the oligomers; and they should have a significantly different density to allow for phase separation, such as greater than 0.1 unit, preferably greater than 0.3 unit. Furthermore, solubility of the cyclic oligomers in the solvent should be in excess of 0.5% by weight, preferably greater than 1.5%, and the solvent should have a boiling point in the range of $-150°$ C. to $270°$ C., preferably $-40°$ to $130°$ C., at one atmosphere. Also, the distribution coefficient for cyclic oligomers should be greater than 0.02 at the operating temperature, preferably greater than 0.08. The distribution coefficient for cyclic oligomers is defined as a ratio of the weight fraction of cyclic oligomers in the extract to the weight fraction of cyclic oligmers in the raffinate at equilibrium. The distribution coefficient is temperature dependent.

Particularly suitable are solvents selected from aliphatic and alicyclic, saturated and unsaturated, branched and straight chain hydrocarbons, and especially those hydrocarbons containing 1 to 15, preferably 3 to 8 carbon atoms per molecule. Specific examples of such solvents are cyclohexane, cyclobutane, hexane, butane, pentane, heptane, and substituted alicyclics.

The oligomer extraction process can be performed batchwise or continuously in multistages, e.g., in a column, where the solvent is fed into the bottom of the column and flows upward, and the liquid polymer is fed at the top of the column and flows downward. In order to bring about more efficient dispersion of two phases, mechanically agitated column is preferable. To minimize the undesirable axial-mixing effect, some form of baffling is generally introduced.

In order to reduce the viscosity of the liquid polymer for more efficient dispersion of two phases and/or to increase the solubility of cyclic oligomers in the solvent preferentially, the extraction can be carried out at higher temperatures as long as the solubility of the liquid polymer in the solvent does not increase substantially and two phases do not become miscible.

The efficiency of the process can be enhanced by using a mixed solvent. The addition of the second solvent acts to increase the solubility of the cyclic ethers in the solvent, or to decrease the solubility of the liquid polymer in the solvent, or both. It also acts to decrease the viscosity of the liquid polymer phase. The second solvent can be miscible or immiscible with the liquid polymer and not necessary to be a suitable extraction solvent by itself. The second solvent can be used at a concentration of 1 to 80% by weight of the mixed solvent. The second solvent can be added to the liquid polymer before the process is begun, or added to the system with the suitable solvent.

After the amount of cyclic oligomers in the liquid polymer has been reduced to a desirable level according to the invention, the liquid polymer can be used for purpose intended after stripping the solvent.

Amount of the solvent employed to remove cyclic oligomers can vary widely and depends on the method employed. Since solubility of the oligomers in the solvent is generally low, relatively large volume of solvent is used, unless a method is employed whereby the solvent is condensed and recycled. Generally speaking, about 100 to 5000 parts by weight of solvent is used per 100 parts by weight of the polymer, and preferably 200 to 500 parts of solvent. The large volume of solvent is required due to low solubility of the oligomers in the solvents. Extraction can take 2 to 3 days, preferably 2 to 20 hours, at a temperature of up to about 120° C., preferably at 40° to 80° C.

The following examples further illustrate the invention described herein and it should be understood that the examples are intended to illustrate and not to limit in any sense the scope of the invention, which is defined by the appended claims.

EXAMPLES 1-6

In the examples described herein, the extraction of liquid epichlorohydrin homopolymers was carried out with an apparatus that allows the solvent to be recovered in-suit. Consequently, the amount of the solvent passed through the liquid polymer was unknown. The apparatus was composed of an extraction unit and a distillation pot connected by a side-arm. During extraction, the extract (oligomer-rich solvent) overflowed from the extraction unit through the lower section of the side-arm and was collected in the distillation pot. In the distillation pot, the solvent was continuously distilled and oligomers extracted out from the liquid polymer were accumulated in the distillation pot. The solvent vapor from the distillation pot was passed through the upper section of the side-arm and condensed at the top of the extraction unit. The condensed solvent from the condenser was collected by a funnel attached to an inner tube, passed through the inner tube downward, and was dispersed through an extra coarse porosity fritted disc at the bottom of the liquid polymer phase. Since the solvent was of a lesser density than the liquid polymer, the dispersed solvent passed upwardly through the liquid polymer phase. At this stage, the solvent was brought to intimate contact with the liquid polymer and cyclic oligomers were extracted from the liquid polymer phase to the solvent phase. Because of the great difference in the density between the solvent (<0.9) and the liquid polymer (1.3), a clear separation of the two phases was obtained in the extraction unit. The extract then overflowed into the distillation pot through the side-arm. The process repeated itself until oligomers in the liquid polymer were reduced to the desirable amount. Normally, the amount of oligomers can be reduced to non-detectable level, as measured by gel permeation chromatography (GPC).

In order to provide better dispersion of the solvent in the liquid polymer in certain experiments, a three neck flask was modified to provide agitation and was used as an extraction unit.

Two samples of liquid epichlorohydrin homopolymer with different molecular weights were studied: Sample A, with a molecular weight (Mn) of about 3,000 and a Brookfield viscosity of about 110,000 cps at 25° C., and Sample B, with a molecular weight of about 2,000 and a Brookfield viscosity of about 60,000 cps at 25° C.

The effectiveness of the extraction was determined by GPC, which indicated amount of polymer below a certain molecular weight. GPC does not differentiate between a cyclic and a non-cyclic polymer. The % by weight of polymers having a number molecular weight less than 625 was measured and compared before and after extraction. The lower the molecular weight of the polymer, the more non-cyclic polymer there was having a number molecular weight of less than 625.

In Example 1, 10.5 weight parts of sample A were treated with about 200 weight parts of cyclohexane at 45° C. with agitation for 10 hours.

In Example 2, 36.1 weight parts of sample A were treated with about 200 weight parts of hexane at 50° C. with agitation for 24 hours.

In Example 3, 49.2 weight parts of sample A were treated with about 200 weight parts of isopropanol at 45° C. with agitation for 24 hours.

In Example 4, 100 weight parts of sample A were treated with about 250 weight parts of hexane at 55° C. without agitation for 30 hours.

In Example 5, 100 weight parts of sample B were treated with about 250 weight parts of cyclohexane at 45° C. without agitation for 36 hours.

In Example 6, 100 weight parts of sample B were treated with about 250 weight parts of hexane at 65° C. without agitation for 19.5 hours.

Before extraction, both samples A and B showed a bimodel distribution of GPC curve. Sample A had about 14.3% by weight of polymer having the number molecular weight below 625 and sample B had about 19.5% by weight of the polymers. In Experiments 1, 2, and 4, the GPC curves showed only one peak for sample A after being extracted by cyclohexane or hexane, despite there being about 1% by weight of polymer having a molecular weight below 625. The results indicate that the presence of cyclic oligomers is not detectable by GPC. About 75-80% by weight of the original polymer was recovered after extraction as oligomer-free polymer. On the other hand, in Experiment 3, isopropanol was used as an extraction solvent. After 25% by weight of the original polymer was extracted out of the extraction unit, 6.6% by weight of the recovered polymer had a molecular weight below 625 and the GPC curve of the recovered polymer showed a bimodel distribution. In Experiments 5 and 6, the GPC curves showed only one peak for sample B after being extracted by cyclohexane or hexane, despite there being about 2-3.5% by weight of polymer having a molecular weight below 625. The results are summarized in Table I.

TABLE I

| | Experiment No. | Solvent | Extraction Temp., °C. | Extraction Time, Hr. | Wt. % of Polymer Recovered | Wt. % of Polymer with Mn <625 |
|---|---|---|---|---|---|---|
| Sample A | 1 | Cyclohexane | 45 | 10 | 76 | 1.1 |
| " | 2 | Hexane | 50 | 24 | 80 | 1.0 |
| " | 3 | Isopropanol | 45 | 24 | 75 | 6.6 |
| " | 4 | Hexane | 55 | 30 | 80 | 1.0 |
| Sample B | 5 | Cyclohexane | 45 | 36 | 76 | 2.2 |
| " | 6 | Hexane | 65 | 19.5 | 80 | 3.5 |

I claim:

1. Method for extracting cyclic oligomers of an epihalohydrin selected from dimers, trimers, tetramers, pentamers, hexamers, heptamers, and the like, from a functionally terminated liquid polyether containing same comprising contacting said polyether with a solvent in which said oligomers are soluble but in which said polyether is substantially insoluble, and separating said solvent from said polyether whereby at least 75% of said oligomers are extracted from said polyether by said solvent, said polyether is selected from homopolymers of an epihalohydrin, copolymers of an epihalohydrin with a cyclic ether monomer containing 2 to 10 carbon atoms, and block copolymers of an epihalohydrin, said copolymers containing 1 to 99 weight percent epihalohydrin in polymerized form.

2. Method of claim 1 wherein extraction of said oligomers is carried out by repeatedly mixing said solvent with said polyether whereby separation of phases takes place, and separating the phases.

3. Method of claim 2 wherein said oligomers have molecular weight of less than about 625, said method being effective to remove at least 90% of said oligomers from said polyethers.

4. Method of claim 3 wherein said solvent is selected from hydrocarbons containing 1 to 15 carbon atoms having boiling points below about 270° C.

5. Method of claim 3 wherein said solvent is selected from alicyclic and aliphatic hydrocarbons containing 3 to 8 carbon atoms having boiling points in the range of about −40° to 130° C., said polyether is selected from hydroxyl-terminated polymers of epihalohydrins.

6. Method of claim 5 wherein said polymers of epihalohydrin contain about 5 to 20% by weight of said oligomers and wherein 100 to 5000 parts by weight of solvent is used per 100 parts by weight of said polyether.

7. Method of claim 5 wherein said polymers of epihalohydrin have molecular weight in the range of about 1000 to 10,000 and said polymers being prepared by cationic ring-opening polymerization.

8. Method of claim 7 wherein said solvent is selected from cyclic and aliphatic butanes, pentanes, hexanes, and heptanes; and wherein extraction of said oligomers is carried out for a duration of up to about 3 days at a temperature below about 120° C.

9. Method of claim 8 wherein said polymers are selected from homopolymers of epichlorohydrin, epibromohydrin, epiiodohydrin, and epifluorohydrin, and said polymers being prepared in the presence of water or ethylene glycol with the use of a catalytic amount of a trialkyl oxonium salt of an $HMF_6$ acid where M is selected from phosphorus, arsenic, and antimony.

10. Method of claim 9 wherein said polymers are selected from homopolymers of epichlorohydrin and wherein said solvent is recycled to said polymer until the desired degree of extraction is attained.

* * * * *